(12) United States Patent
Frota de Souza Filho

(10) Patent No.: US 10,040,127 B2
(45) Date of Patent: Aug. 7, 2018

(54) BORING BAR WITH IMPROVED STIFFNESS

(71) Applicant: Kennametal Inc., Latrobe, PA (US)

(72) Inventor: Ruy Frota de Souza Filho, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 299 days.

(21) Appl. No.: 14/211,950

(22) Filed: Mar. 14, 2014

(65) Prior Publication Data

US 2015/0258612 A1 Sep. 17, 2015

(51) Int. Cl.
*B23B 29/02* (2006.01)
*B23P 15/28* (2006.01)
(Continued)

(52) U.S. Cl.
CPC .......... *B23B 29/022* (2013.01); *B23B 27/002* (2013.01); *B23B 27/007* (2013.01);
(Continued)

(58) Field of Classification Search
CPC ...... B23P 15/28; Y10T 408/76; Y10T 408/78; B23B 29/022; B23B 2222/80; B23B 2226/275; B23B 2250/16
See application file for complete search history.

(56) References Cited

U.S. PATENT DOCUMENTS 2,606,366 A * 8/1952 Stevens .................... A61C 3/02
188/268

3,292,237 A * 12/1966 Fisher .................. B23B 27/002
144/218
(Continued)

FOREIGN PATENT DOCUMENTS

EP 94557 A1 11/1983
EP 812641 A1 12/1997
WO WO 2009045155 A1 * 4/2009 ........... B23B 27/002

OTHER PUBLICATIONS

"Anti-vibration Enginnering in Internal Turning Using a Carbon Nanocomposite Damping Coating Produced by PECVD Process"; Qilin Fu, Daniel Lundin and Cornel M. Nicolescu; Nov. 22, 2013.*
(Continued)

*Primary Examiner* — Daniel Howell
*Assistant Examiner* — Paul M Janeski
(74) *Attorney, Agent, or Firm* — Matthew S. Bedsole

(57) ABSTRACT

A tunable or tuned boring bar having increased stiffness is provided. Increasing the stiffness of the bar increases the natural frequency, thereby reducing directional deformation of the bar during use. The tunable boring bar includes a distal portion configured to support a tool, a proximal portion configured for attachment to a support structure of a metalworking machine, and a body, which is at least partially tubular, extending between the proximal portion and the distal portion. The tubular portion of the body has an elongated cylindrical cavity. The body of the boring bar includes a core layer formed from a first material and a coating layer formed from a second material. The second material has a higher modulus of elasticity than the first material. In certain configurations, the coating layer is bonded to the core layer by cladding, welding, chemical adhesives, chemical vapor deposition, pulsated plasma diffusion, or combinations thereof.

19 Claims, 7 Drawing Sheets

(51) Int. Cl.
  *B23B 27/00* (2006.01)
  *C23C 24/10* (2006.01)
(52) U.S. Cl.
  CPC .......... *B23P 15/28* (2013.01); *C23C 24/103* (2013.01); *B23B 2222/80* (2013.01); *B23B 2226/275* (2013.01); *B23B 2250/16* (2013.01); *Y10T 408/76* (2015.01); *Y10T 408/78* (2015.01)

(56) References Cited

U.S. PATENT DOCUMENTS

| | | | |
|---|---|---|---|
| 3,447,402 A | 6/1969 | Ray | |
| 3,743,556 A | 7/1973 | Breton et al. | |
| 3,774,730 A | 11/1973 | Maddux | |
| 4,061,438 A | 12/1977 | New | |
| 4,251,907 A * | 2/1981 | Bleckmann | B21C 37/0803 138/171 |
| 4,743,515 A | 5/1988 | Fischer et al. | |
| 4,784,922 A * | 11/1988 | Yoshimura | B23K 20/04 148/530 |
| 4,998,851 A | 3/1991 | Hunt | |
| 5,066,546 A | 11/1991 | Materkowski | |
| 5,125,774 A | 6/1992 | Catenacci | |
| 5,131,481 A | 7/1992 | Smith | |
| 5,643,658 A | 7/1997 | Uchino et al. | |
| 6,309,762 B1 | 10/2001 | Speckert | |
| 6,443,673 B1 * | 9/2002 | Etling | B23B 29/022 188/379 |
| 6,464,433 B1 | 10/2002 | Shaffer | |
| 6,855,405 B2 | 2/2005 | Okada et al. | |
| 6,935,816 B2 | 8/2005 | Lee et al. | |
| 8,221,517 B2 | 7/2012 | Mirchandani et al. | |
| 2008/0292418 A1 | 11/2008 | Kay et al. | |
| 2012/0237307 A1 | 9/2012 | Niitani | |
| 2013/0272811 A1 * | 10/2013 | Kay | B23B 29/022 408/238 |

OTHER PUBLICATIONS

K-4295-Denitool_Advertisement—Carbide_boring_bar_with_increased_rigidity.
K-4295-Lee, D.G.,—Design_and_manufacture_of_a_carbon_fiber_epoxy_rotating_boring_ba.
K-4295-Nagano, S.—Development_of_a_composite_boring_bar.
K-4295-Lee,D.G.—Manufacturing_and_Testing_of_Chatter_Free_Boring_Bars.
K-4295-Szuba, P.—Optimization_of_Hollow_Cantilevered_Boring_Bar_Stiffness.
Houck III, A Tuned Holder for Increased Boring Bar Dynamic Stiffness, Journal of Manufacturing Processes, 2011, 24-29, 13.

* cited by examiner

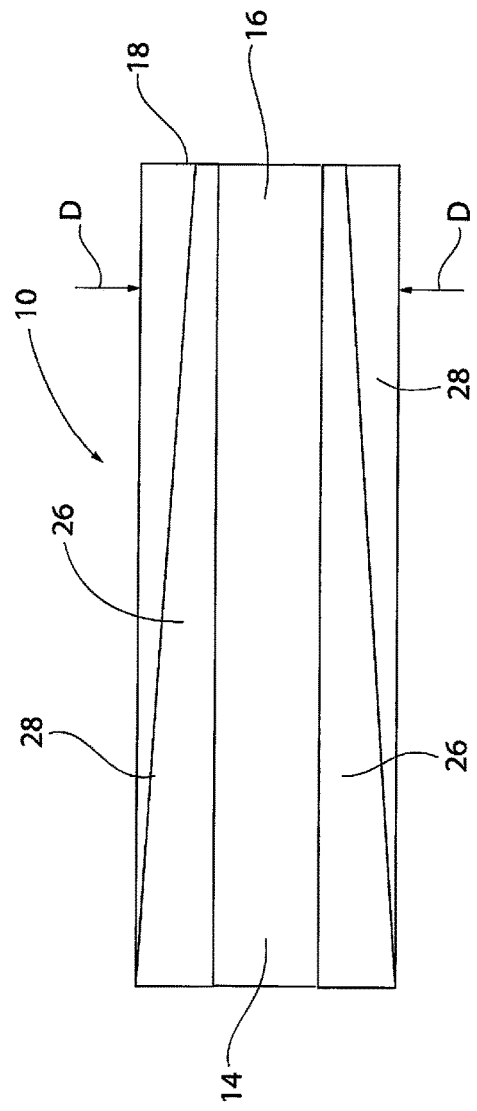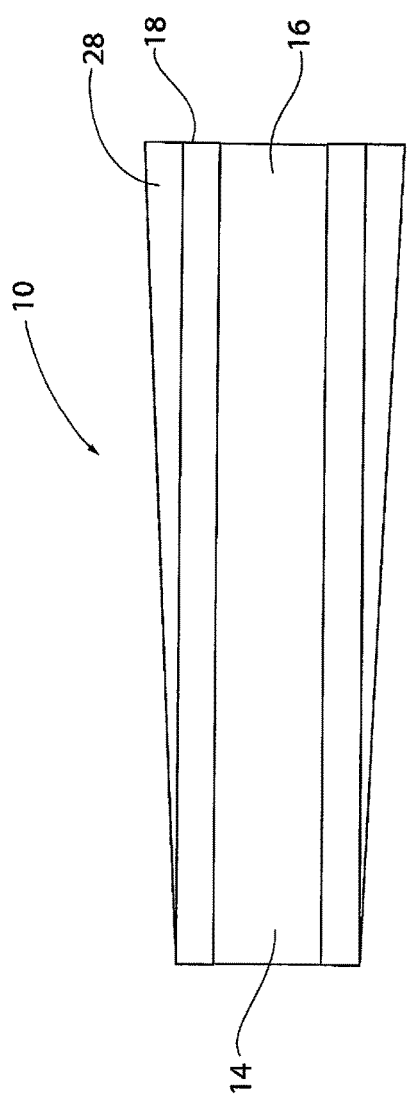

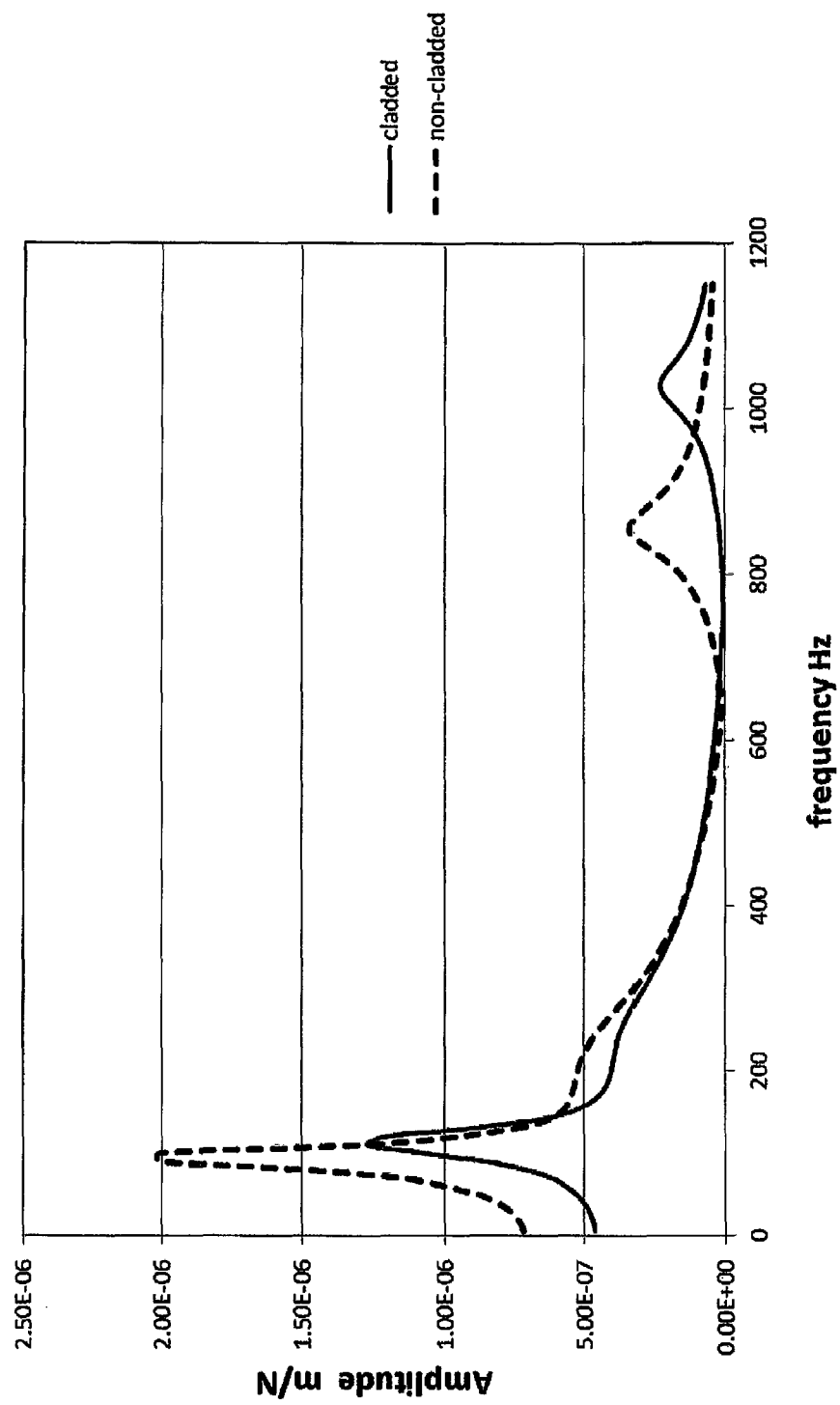

BORING BAR WITH IMPROVED STIFFNESS

BACKGROUND OF THE INVENTION

Field of the Invention

This invention relates to a boring bar for suppressing vibrations caused in machining processes and, more particularly, to a tunable boring bar, in which at least a portion of the bar body is clad with a material having a high stiffness.

Description of Related Art

During a metalworking operation, there is relative motion between a workpiece and a cutting tool being urged against the workpiece. Specifically, the surface finish left on the workpiece by a previous pass of the cutting tool creates variation in chip thickness that, in turn, creates fluctuation of the cutting force magnitude. The relative motion between the workpiece and the tool is magnified by this fluctuation of the cutting force and may lead to an unstable condition known as chatter. Chatter is an example of self-excited vibration. As a result of this vibration, a poor quality surface finish and an out-of-tolerance finished workpiece may be produced.

Chatter may be especially problematic when the cutting tool is coupled to an elongated boring bar. A boring bar is essentially a cantilevered member, which is anchored at one end and attached to the cutting tool at the other end. Boring bars are conventionally formed from a metal alloy, such as, carbon steel. To reduce vibrations of the boring bars, cutting parameters such speed and depth of cut may be reduced, decreasing the metal removal rate. However, this approach interferes with production output leading to low productivity.

Numerous attempts to eliminate boring bar vibration are known. One method for reducing vibration is using a boring bar fabricated from a stiffer material, such as solid carbide (e.g., tungsten carbide). However, solid carbide boring bars are more expensive than conventional steel bars. Furthermore, with solid carbide boring bars, although chatter and vibration are reduced by the inherently high stiffness of the solid carbide bar, vibration may still build to an unacceptable level. Additionally, solid carbide is fairly brittle and a minor impact upon the boring bar during use or setup may inadvertently damage the bar. A carbide boring bar extending between a steel adapter and steel tip portion is disclosed in U.S. Pat. No. 6,935,816 to Lee, et al.

Another attempt to reduce vibration in boring bars is by attaching a dynamic vibration absorber mechanisms to or within the boring bar. The dynamic vibration absorber may be used for tuning the boring bar. A dynamic vibration absorber for use in a tunable boring bar, comprised of a cylindrical mass of a high density material supported on resilient bushings, is disclosed in U.S. Pat. No. 3,774,730. When optimally tuned, the mass oscillates in response to vibration produced in the boring bar to cancel out vibration. The absorber may be tuned to accommodate the boring bar for the changes in, the length of the boring bar and the weight of cutting tool connected at the end of the bar. Such an adjustment is made by longitudinally urging pressure plates at opposing ends of the cylindrical mass thereby compressing the rubber bushings against the mass, which alters the stiffness of the rubber supports to change the frequency of the cylindrical mass. Generally, the process of tuning the boring bar is easier for boring bars having higher natural frequencies, where smaller tuning masses can be applied. Therefore, shorter and stiffer bars are typically easier to tune than longer more flexible bars. Tunable boring bars are typically formed from materials that can be machined, such as carbon steel, so that the bar can be fitted to accommodate the vibration absorption mechanism. Therefore, tunable boring bars generally are not made from stiffer materials, such as carbide, which cannot be machined through conventional means. In addition to tunable boring bars, some boring bars are designed with internal vibration absorber mechanisms that are not tunable. These anti-vibration bars will be referred to as AVB bars.

However, even tunable boring bars and AVB bars do not produce satisfactory performance for boring bars with narrow diameter and longer length. This limitation is problematic since, for certain cutting applications, narrow long length boring bars are particularly desirable. Steel tunable boring bars are generally only effective for Length/outer Diameter (L/D) ratios of less than about 10. Also, steel tunable boring bars even when dynamically stable may not have high enough static stiffness to prevent deflection, which may limit the ability of achieving desirable dimensional part quality. When necessary, for some applications, tunable boring bars with a solid carbide shank may be used if higher L/D ratios are required. However, as described above, solid carbide is expensive, heavy, and brittle, making it less useful for certain applications. Therefore, there is a need for a tunable boring bar that reduces vibration to provide improved performance for boring bars having high L/D ratios, and preferably for L/D ratios of 10 and greater. The boring bar should be capable of use with presently available toolholder assemblies and dynamic tuning arrangements. The tunable boring bar of the present invention provides some or all of these features.

SUMMARY OF THE INVENTION

A tunable or tuned boring bar having increased dynamic stiffness is provided. Increasing the static stiffness of the bar increases the dynamic stiffness reducing the amplitude of vibration of the bar during use. Therefore, according to one aspect of the invention, a tunable or tuned boring bar is provided having a distal portion configured to support a tool, a proximal portion configured for attachment to a support structure of a metalworking machine, and a tubular body extending between the proximal portion and the distal portion. The tubular body has an elongated cylindrical cavity therein of substantially uniform diameter. The body of the boring bar includes a core layer formed from a first material and a coating layer formed from a second material. The first material has a different modulus of elasticity than the second material. In certain configurations, the core layer of the body is bonded to the coating layer by cladding, welding, adhesives, or combinations thereof.

The coating layer may be bonded to a portion of an outer surface of the core layer. For example, the coating layer may include a strip of material extending longitudinally along a portion of the core layer.

In certain configurations, the first material is carbon steel, stainless steel, a reinforced steel composite, or any combination thereof. Similarly, the second material may be a material having a modulus of elasticity greater than steel. For example, the second material may be tungsten carbide.

In certain further configurations, a thickness of the coating layer is less than about 10% of the outside diameter of the bar. The tunable boring bar may include a dynamic vibration absorber attached to the bar or inserted in the cavity of the body.

According to a further aspect of the invention, a method of forming a tunable boring bar is provided. The tunable boring bar has a distal portion configured to support a tool, a proximal portion configured for attachment to a support structure of a metalworking machine, and a tubular body extending between the proximal portion and the distal portion. The tubular body has an elongated cylindrical cavity therein, which may be of substantially uniform diameter. The method includes the steps of forming a tubular body by bonding to a tubular core layer formed from a first material to a coating layer formed from a second material; mounting a tunable absorber into a cavity of the tubular body; mounting a cutting tool to one end of the boring bar; and securing the other end of the boring bar to a mounting structure of a metalworking machine. The second material has a higher modulus of elasticity than the first material.

In certain embodiments of the method, the first material is carbon steel, stainless steel, a reinforced steel composite material, or any combination thereof. The second material may be a carbide material having a modulus of elasticity greater than carbon steel. Furthermore, the coating layer may include a strip of material wound about the core layer in a helical pattern. Alternatively, the coating layer may include a strip of material extending in a straight path longitudinally along the core layer.

In certain further embodiments, the core layer is bonded to the coating layer by a cladding process. Additionally, a thickness of the coating layer may be 10% of the outside diameter of the bar when the bar is circular or 10% of the maximum width if the bar is not circular.

According to a further aspect of the invention, a tunable toolholder supported on a metalworking machine is provided. The tunable toolholder includes a boring bar having a tubular body and a cavity extending longitudinally through the body; a toolholder head adapted to receive a cutting tool attached to a distal end of the boring bar; a mounting structure attached to a proximal end of the boring bar, configured to attach the boring bar to a portion of the metalworking machine; and a tunable (or tuned) absorber inserted within the cavity of the body of the boring bar. The tubular body of the boring bar may include a core layer formed from a first material and a coating layer formed from a second material. The second material has a higher modulus of elasticity than the first material. Furthermore, the body may have only a portion that is tubular for accommodating the absorber and the remainder of the body may be solid throughout or have only a small cavity for other purposes, such as for coolant flow.

BRIEF DESCRIPTION OF THE DRAWINGS

Some of the advantages and features of the preferred embodiments of the invention have been summarized hereinabove. These embodiments, along with other potential embodiments of the device, will become apparent to those skilled in the art when referencing the following drawings in conjunction with the detailed descriptions as they relate to the figures.

FIG. 7 is a longitudinal cross section of a shank of a boring bar, according to one embodiment of the invention;

FIG. 8 is a longitudinal cross section of a shank of a boring bar, according to one embodiment of the invention;

FIG. 10 is a line graph illustrating an amplitude of vibration of a boring bar on the frequency domain between a cladded and non-cladded bar.

DESCRIPTION OF THE INVENTION

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

The present invention is directed to a boring bar 10 used for boring deep holes in work pieces. The boring bar 10 has high dynamic stiffness, which reduces lateral deformation of the bar 10 during use. To facilitate discussion, a toolholder assembly 2, including tunable boring bar 10, having a dynamic anti-vibration mechanism, as is known in the prior art, will now be described. However, the subject invention may also be used with a boring bar that does not have anti-vibration features, as well as with non-tunable AVB bars.

Figure 1:
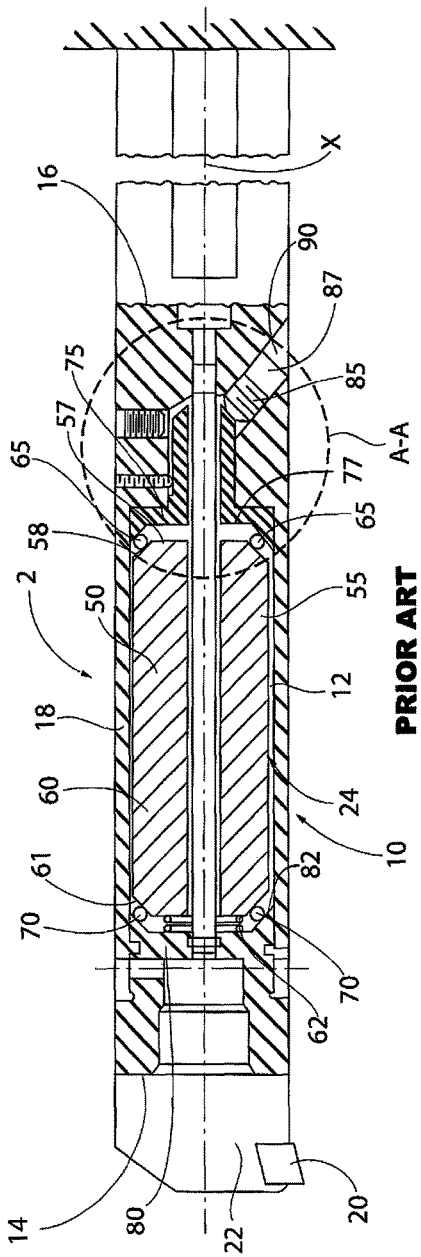
FIG. 1 is a schematic drawing of a toolholder assembly including a tunable boring bar, as is known in the prior art.
Figure 2:
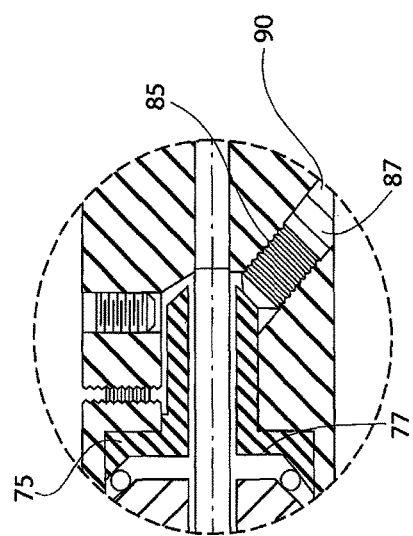
FIG. 2 is an expanded view of the toolholder assembly of FIG. 1 from the encircled area labelled A-A, as is known in the prior art.

With reference to FIGS. 1 and 2, a boring bar 10, as is known in the prior art, is illustrated. The boring bar 10 has a central cavity 12 extending inwardly from the distal end 14 of the boring bar 10. The boring bar 10 includes a body 18, such as a steel shank, extending between a proximal end 16 and distal end 14 of the bar 10. The proximal end 16 of the boring bar 10 may be fixedly connected to a supporting structure, such as a supporting structure of a metalworking machine (not shown). Thus, the boring bar 10 is a cantilevered beam, in which the proximal end 16 is secured to the supporting structure, and the distal end 14 is free. A cutting tool, such as a cutting insert 20, is mounted in a conventional manner to a boring bar head 22 positioned at the distal end 14 of the body 18. Steel boring bars 10 are commercially available from a number of manufacturers, including Kennametal Inc., of Latrobe, Pa. Kennametal manufactures steel, tunable boring bars with a diameter of about 25 mm to 100 mm. The useful or unsupported length of the bar is dependent on the specific application, but is generally between 6 and 10 times the outer diameter.

As discussed herein, use of the boring bar 10 in a metalworking operation will produce vibrations that may deteriorate the surface finish and dimensional tolerance of a workpiece. For this reason, the boring bar 10 is provided with a tunable absorber 24 that dampens the vibrations generated in the boring bar 10.

A tunable (adjustable) or tuned (non-adjustable) absorber may be installed within the central cavity 12 of the body 18. The tunable absorber 24 includes a generally cylindrical absorber mass 50 having a first end 55 with an end portion 57 and a second end 60 with an end portion 62. Each end portion 57, 62 has an outwardly facing conical surface 58, 61. A first elastomer support 65 and a second elastomer support 70 circumscribe the conical surface 58 on the first end 55 and the conical surface 61 on the second end 60, respectively, of the absorber mass 50. A first pressure plate 75 and a second pressure plate 80 are positioned within the central cavity 12 proximate to the ends 55, 60 of the absorber mass 50. The first pressure plate 75 has an inwardly facing conical surface 77 while the second pressure plate 80 also has an inwardly facing conical surface 82. Each pressure plate 75, 80 surrounds an elastomer support 65,70 such that the inwardly facing conical surfaces 77, 82 of the pressure plates 75, 80 urge each elastomer support 65, 70 against the respective conical surface 58, 61 of the first end 55 and the second end 60 of the absorber mass 50.

The first pressure plate 75 is movable within the central cavity 12 along the longitudinal axis X. A positioning member, such as an adjusting screw 85, may be used to adjust the compression of the elastomer supports 65, 70 against the absorber mass 50. As a positioning member, the adjusting screw 85 extends through a bore 90 from the outer surface of boring bar 10 to contact the first pressure plate 75. The adjusting screw 85 is threadably mated with the bore 90 such that the rotation of the adjusting screw 85 at a screw head 87 urges a contact end 89 of the adjusting screw 85 against or away from the first pressure plate 75, thereby displacing the first pressure plate 75 along the longitudinal axis X to increase or decrease the compression of the elastomer supports 65, 70.

To tune the subject boring bar 10, an operator monitors the vibration of the boring bar 10 and tightens or loosens the adjusting screw 85, thereby adjusting the pressure of the elastomer supports 65, 70 against the absorber mass 50. Alternatively, it is also possible to predefine the amount of compression necessary on the elastomer supports 65, 70 against the absorber mass 50 to minimize vibration under different operating conditions. In this manner, a machine operator may simply adjust the compression of the elastomer supports 65, 70 to predetermine levels for tuning.

Figure 3:
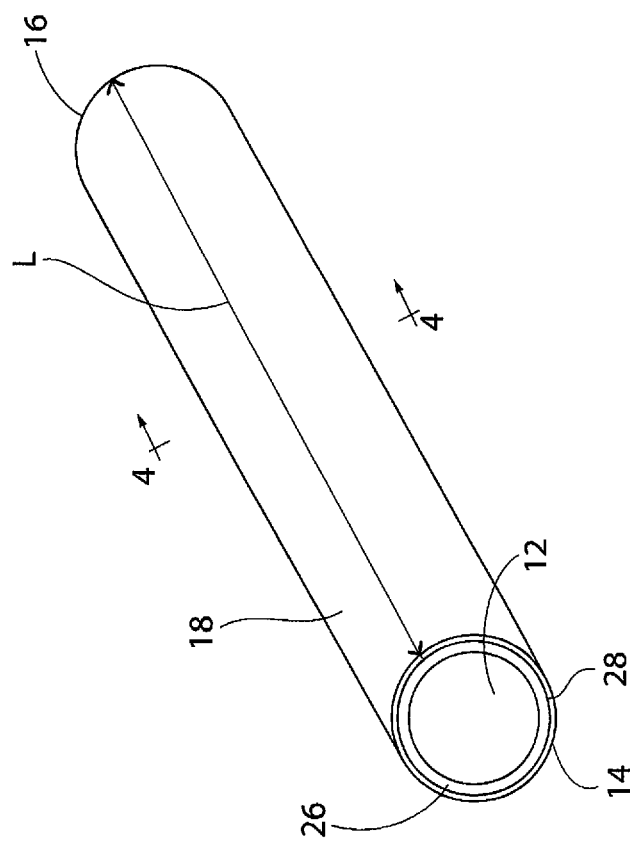
FIG. 3 is a perspective view of a shank of the boring bar, according to one embodiment of the invention.
Figure 4:
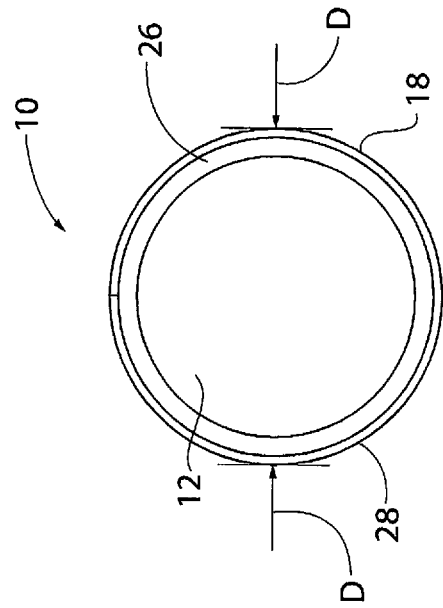
FIG. 4 is a cross sectional view of the shank of FIG. 3 along line 4-4.

Having generally described the structure and operation of a toolholder assembly 2 and boring bar 10, the boring bar 10 of the present invention will now be described in detail. With reference to FIGS. 3 and 4, the boring bar 10, which may or may not be used with a separate anti-vibration device, is a tubular structure having a proximal end 16, configured for connection to a mounting structure of a metalworking machine, and a distal end 14, configured to be connected with a cutting tool, such as cutting insert 20 (FIG. 1). The boring bar 10 is enclosed by a hollow, tubular body 18 having a central cavity 12 adapted to receive a tunable absorber 24 (FIG. 1). The tubular body 18 has a length L and an outer diameter D. In general, under normal operating conditions, conventional boring bars can operate without excess vibration when they have an L/D ration of less than 10. Therefore, it is typical for anti-vibration bars to have an L/D ratio of 10 or more and it is this ratio to which the subject invention is directed.

The tubular body 18 comprises at least two layers formed from different materials. A first layer, referred to hereinafter as the core layer 26, is formed from a first material and a second layer, referred to hereinafter as a coating layer 28, is formed from a second material having a modulus of elasticity that is greater than that of the first material. In a preferred and non-limiting embodiment, the core layer 26 is a cylindrical layer formed from a conventional boring bar material, such as carbon steel, stainless steel, a steel composite material, or combinations thereof. The coating layer 28 is made from a material, such as carbide, carbon fiber, or a carbon composite material. The coating layer 28 is bonded to or deposited on the inner surface and/or the outside surface of the core layer 26 by a bonding process, such as cladding, chemical vapor deposition (CVD), pulsed plasma diffusion (PPD), welding, or melting/drip coating. Cladding and similar bonding processes are typically used to form a structure with a thin layer covering a thicker core layer.

Cladding is a method of bonding two dissimilar materials together. In a preferred and non-limiting embodiment, a process for forming a carbide layer by cladding involves applying a mesh containing tungsten carbide particles to the core layer 26. Another piece of mesh containing particles of braze alloy or a similar bonding agent is placed over the mesh containing the carbide particles. The core layer 26 and mesh materials are then heated to a brazing temperature of the braze alloy. Braze infiltrates down into the carbide particles and brazes the carbide particles to each other and to the core layer 26. A process for coating a metallic substrate with a coating containing tungsten carbide by applying a mesh containing carbide particles to a substrate surface is disclosed in U.S. Pat. No. 3,743,556.

As will be appreciated by one having ordinary skill in the art, while the layers 26, 28 are described as separate layers herein, some degree of diffusion of the coating layer 28 into the core layer 26 occurs during cladding. Thus, there may not be a definite bond line or boundary between the layers 26, 28. Furthermore, a portion of the diffusion region of the tubular body 18 may exhibit material properties of both layers 26, 28.

The coating layer 28 may also be a cylindrical structure covering at least a portion of the core layer 26. The coating layer 28 is formed from a material having a modulus of elasticity greater than that of the core layer 26. For example, when the core layer 26 is formed from a metal, such as steel, the coating layer 28 may be formed from tungsten carbide or silicon carbide. The coating layer 28 may also include carbon fiber or carbon composite materials. Generally, the coating layer 28 is a thin layer when compared to the thickness of the bar 10. For example, the thickness of the coating layer 28 will generally be about 10% or less of the diameter of the bar 10 when the bar 10 is circular or 10% of the maximum width if the bar 10 is not circular.

However, the arrangement of the core 26 and coating 28 layers described herein is not intended to limit the scope of the invention in any way. For example, it is recognized that the stiffer coating layer 28 may be provided on the inner surface of the core layer 26. Similarly, the core layer 26 and/or the coating layer 28 need not extend the entire length of the tubular body 18. For example, the stiffer coating layer 28 may only be provided along portions of the tubular body 18 that experience the greatest strain during use.

Figure 6:
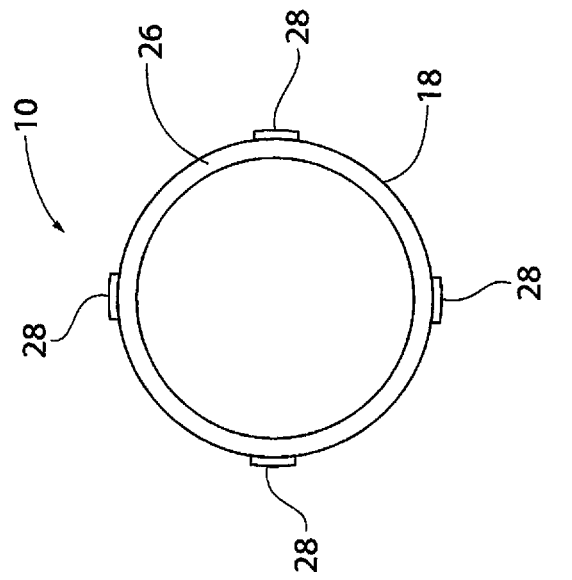
FIG. 6 is a front view of a shank of a boring bar, according to one embodiment of the invention.
Figure 5:
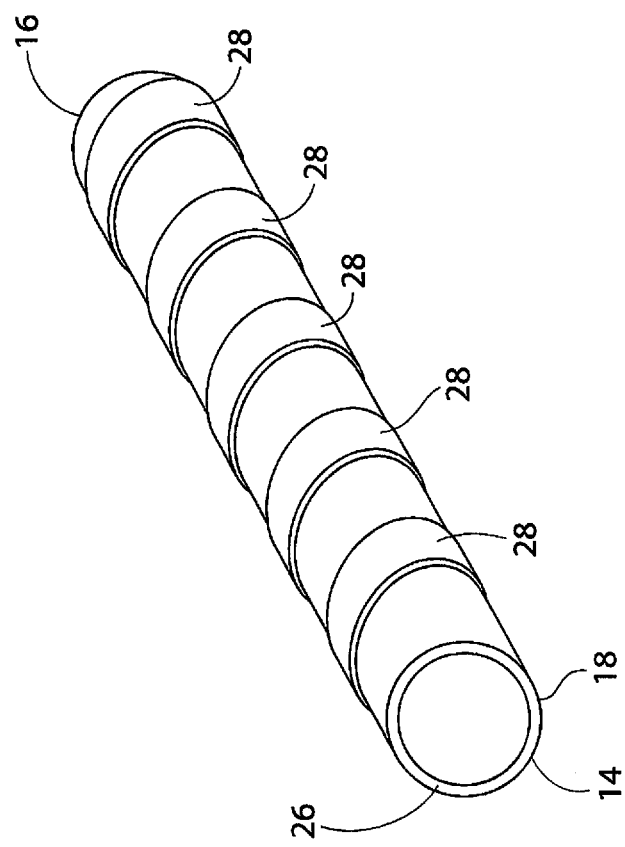
FIG. 5 is a perspective view of a shank of a boring bar, according to one embodiment of the invention.

Additionally, the coating layer 28 need not be a cylindrical shape. Instead, with reference to FIG. 5, the coating layer 28 may consist of a strip of stiff material attached to the core layer 26. As shown in FIG. 5, the strip may be wound around the tubular body 18 in a helical pattern. Similarly, with reference to FIG. 6, the strip may extend in a straight path longitudinally along the length of the tubular body 18. The pattern or amount of the tubular body 18 covered by the coating layer 28 can be modified or adapted for particular machining applications. For example, for especially narrow or long boring bars 10 (high L/D ratio) the coating layer 28 may extend along the entire length of the body 18 and may be thicker than is required for shorter or wider bars 10. For bars 10 with a smaller L/D ratio, the coating layer 28 may only cover a small portion of the body 18. Advantageously, as will be appreciated by one having ordinary skill in the art, reducing the amount of carbide material reduces the cost and weight of the boring bar 10. Similarly, with reference to FIG. 7, the coating layer 28 may have a conical structure, which is thicker at the proximal end 16 of the bar 10 and tapers toward the other end of the bar 10. Similarly, with reference to FIG. 8, both the core layer 26 and the coating layer 28 may be tapered to form a bar 10 having a constant outer diameter D and a coating layer 28 of varying thickness.

Having generally described the structure of the invented boring bar 10, performance benefits of a boring bar 10 formed by depositing a coating layer 28 to a core layer 26 will now be discussed. More specifically, the present inventor has recognized that increasing the total static stiffness of the boring bar 10 improves performance by increasing the dynamic stiffness, which decreases the amplitude of the vibration of the bar 10. Increasing the overall static stiffness also increases the natural frequency of the bar 10, which further improves cutting performance.

Figure 9A:
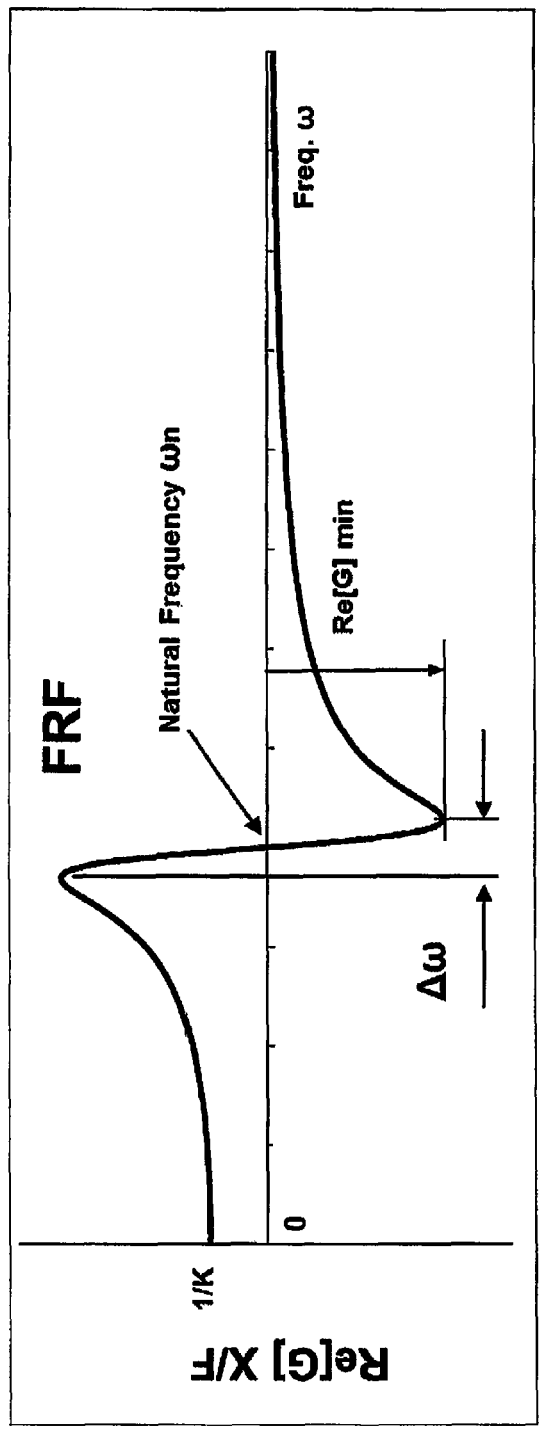
FIG. 9A is a line graph depicting the Frequency Response Function (FRF) for a vibrating bar, as is known in the prior art.
Figure 9B:
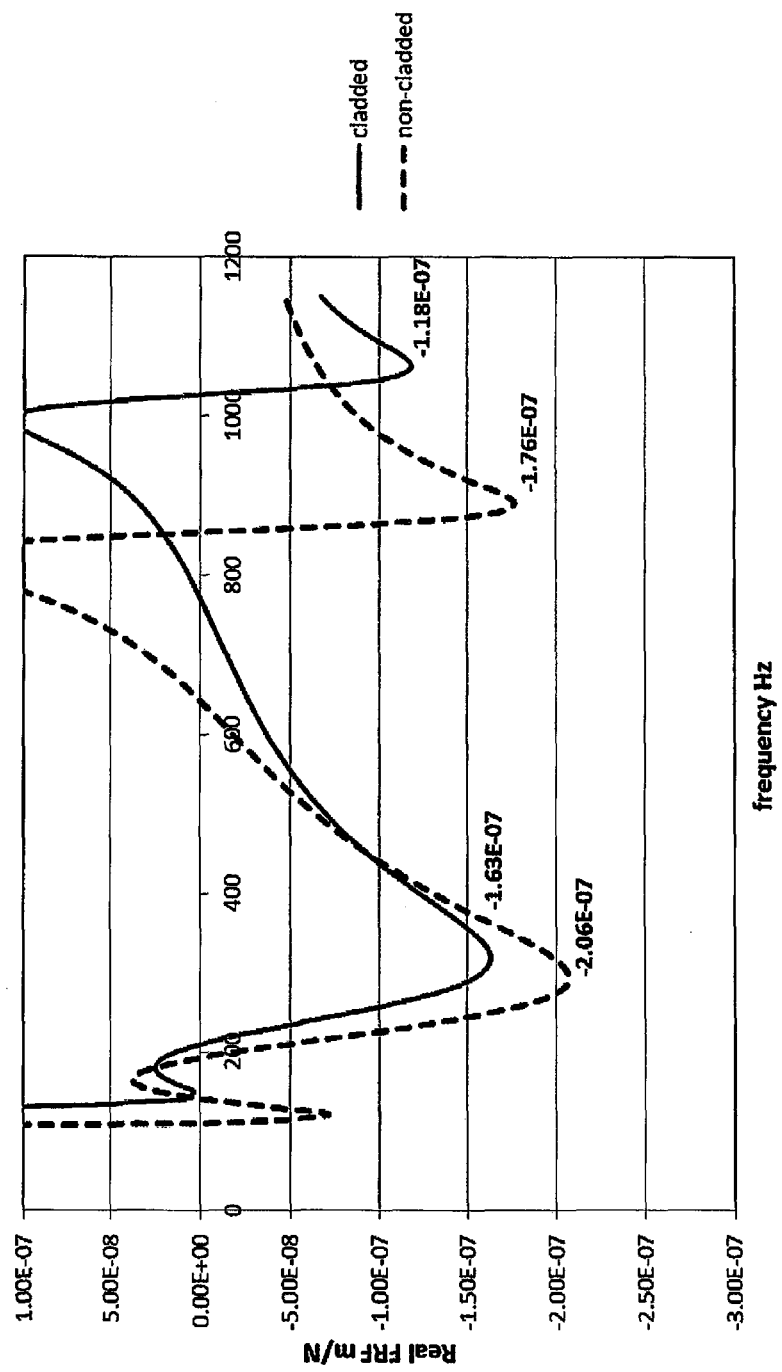
FIG. 9B is a line graph illustrating a real component of the frequency response function of the displacement between a cladded and non-cladded bar.

With reference to FIGS. 9A and 9B, the principle that increasing static stiffness increases natural frequency and reduces vibration amplitude is illustrated by the equation used to approximate the minimum $(Re[G]_{min})$ and/or maximum $(Re[G]_{max})$ frequency response function (FRF) or transfer function of a vibrating bar, as is reproduced below:

$$Re[G]_{max} = \frac{1}{4K\zeta(1-\zeta)} \text{ at } \omega = \omega_n(1-\zeta); \text{ and}$$

$$Re[G]_{min} = \frac{1}{4K\zeta(1+\zeta)} \text{ at } \omega = \omega_n(1+\zeta).$$

A graphical representation of the FRF or transfer function is illustrated in FIG. 9A.

The transfer function characterizes the dynamic response of system in the frequency domain. It is a complex function that can be represented by real and imaginary components, or alternatively as amplitude and phase.

The minimum value of the real part of the transfer function $(Re[G]_{min})$ can be used to predict the dynamic stability of the boring bar during machining. Similarly, the maximum chip width (or depth of cut) for stable cut can be calculated from the equation:

$$b_{lim} = \frac{1}{2K_s\mu Re[G]_{min}},$$

wherein
$K_s$ is the material cutting coefficient, $\mu$ is the force orientation factor, and
$Re[G]_{min}$ is the value of the negative peak of the real component of the FRF.

By increasing the depth of cut, the metal removal rate can be increased, maximizing productivity. Therefore, it is desirable that the absolute value of $Re[G]_{min}$ be minimized.

In the $Re[G]_{min}$ equation, K represents that static stiffness of the bar. Stiffness is defined as the force required to bend or deform a material a particular amount $$\left(\text{i.e., } \frac{\text{Force}}{\text{Displacement}}\right).$$

$\zeta$ is the dampening ratio, which is equal to $$\frac{\Delta\omega}{2\omega_n}.$$

In the dampening ratio equation, $\Delta\omega$ is the difference in frequency between the frequency at which the maximum and minimum amplitude occur, specifically the difference in frequency between when $Re[G]_{max}$ and $Re[G]_{min}$ occur. $\omega_n$ is the natural frequency of the bar. As can be seen from the $Re[G]$min equation, increasing the static stiffness K and/or the dampening constant $\zeta$ of the bar reduces the absolute value of the frequency response $(Re[G]_{min})$. Cladding a stiff material to a less stiff material increases the total stiffness K of a boring bar.

The principle that increasing stiffness reduces vibration displacement is illustrated in FIG. 9B and FIG. 10. FIG. 9B is a line graph illustrating the real part of the transfer function of the boring bar. The x-axis of the graph is the frequency in hertz. The y-axis represents the real component of the displacement in meters per applied force in Newton (m/N). The non-cladded bar is a 10 to 1 steel bar that is 50 mm in diameter. The bar is tuned using a known tuning mechanism, such as the tuning mechanism illustrated in FIG. 1. In the non-cladded bar, the screws of the tuning mechanism are turned 2.5 turns. The cladded bar is a steel bar in which the outer 2.5 mm of the bar is replaced with a stiff carbide material. Thus, the total bar diameter is still 50 mm. As shown in FIG. 9B, each bar has a plurality of maxima and minimum, corresponding to the displacement amplitude at various vibrating frequencies. Specifically, a first mode or natural frequency appears at about 100 hertz. A second mode between 700 and 900 hertz. The first vibration mode exhibits two secondary modes because of the tuning mechanism contained within the bar that modifies vibrating characteristics.

As shown in FIG. 9B, for all modes, the cladded bar has a reduced (e.g. closer to zero) amplitude compared to the non-cladded bar. Furthermore, the frequency of each mode for the cladded bar is greater than the frequency of the corresponding mode of the non-cladded bar. FIG. 10 illustrates the total amplitude (or magnitude) of the vibration in m/N as function of frequency. It can be seen that the amplitude of the vibration for the two modes is significantly reduced when the outer 2.5 mm of the bar is replaced with a stiff carbide material. In view of these results, it is clear that the stiffer (e.g., cladded) bar has a reduced displacement (e.g. amplitude) and increased natural and modal frequencies compared with less stiff bars. Accordingly, for reasons described above, the cladded boring bar of the present invention has improved mechanical properties compared to less stiff boring bars formed entirely from steel. The improved mechanical properties result in finished workpieces that can be formed within a tighter tolerance and with fewer mistakes or imperfections.

In view of these principles and with the goal of reducing frequency response and directional displacement of the bar, the inventor of the present boring bar 10 recognized that attaching a thin layer of a material, having a modulus of elasticity, to a material having a lower modulus of elasticity, but of a lighter material, achieved more desirable results than did bars formed from solid carbide. Furthermore, materials having a lower stiffness are generally less expensive and easier to machine compared to stiffer counterparts. Ease of machinability means that the bar 10 can be more easily modified to include tuning mechanisms, dampening mechanisms, and the like. Therefore, being able to form the majority of the bar 10 from a material of lower stiffness reduces costs compared to solid carbide bars. Cladding effectively deposits a thin layer of a material to a surface of another material layer. Therefore, for reasons described herein, a cladded bar 10 offers certain benefits, in terms of manufacturing efficiencies and mechanical properties, compared to bars formed entirely from a single material, such as steel or carbide.

In some instances a tuneable head portion may be made of steel attached to a solid carbide portion, with no cavity therein for an absorber, as a hybrid solution. Such a design may be enhanced by using the boring bar in accordance with the subject invention. In particular, at least a portion of the bar may not have a cavity extending therethrough, or the cavity may be small and intended for other purposes such as coolant flow. Under these circumstances it may be desirable to provide a solid carbide section, without a cavity for the tuneable or tuned absorber, in the region in which the boring bar is secured to the machine. In this manner, the maximum stiffness may be provided by the carbide portion and the additional benefit of the cladded bar portion with the tuneable or tuned absorber may be realized.

While several embodiments of the invention are shown in the accompanying figures and described hereinabove in detail, other embodiments will be apparent to, and readily made by, those skilled in the art without departing from the scope and spirit of the invention. For example, it is to be understood that this disclosure contemplates that, to the extent possible, one or more features of any embodiment can be combined with one or more features of any other embodiment. Accordingly, the foregoing description is intended to be illustrative rather than restrictive.

The invention claimed is:

1. A boring bar assembly comprising:
a bar having a body and a cavity extending longitudinally along the body;
a toolholder head adapted to receive a cutting tool attached to a distal end of the bar;
a mounting structure attached to a proximal end of the bar, configured to attach the bar to a portion of the metalworking machine;
a tunable or tuned absorber inserted within the central cavity of the body of the bar;
wherein the body of the bar comprises a core layer formed from a first material and a coating layer formed from a second material and bonded to the first layer;
wherein the second material has a higher modulus of elasticity than the first material; and
wherein the coating layer is bonded to the core layer by cladding.

2. The boring bar assembly of claim 1, wherein the core layer is a cylindrical structure.

3. The boring bar assembly of claim 2, wherein the coating layer is bonded to a portion of an outer surface of the core layer.

4. The boring bar assembly of claim 1, wherein the first material is carbon steel, stainless steel, a reinforced steel composite, or any combination thereof.

5. The boring bar assembly of claim 1, wherein the second material comprises a carbide material.

6. The boring bar assembly of claim 1, wherein a thickness of the coating layer is less than 10% of the diameter of the bar when the bar is cylindrical and less than 10% of the maximum width of the bar when the bar is not cylindrical.

7. The boring bar assembly of claim 1, wherein a portion of the proximal end of the bar does not have a cavity to accommodate the absorber.

8. The boring bar assembly of claim 1, wherein the body is at least partially tubular.

9. A boring bar comprising a distal portion configured to support a tool, a proximal portion configured for attachment to a support structure of a metalworking machine, and a tubular body extending between the proximal portion and the distal portion, having an elongated cylindrical cavity,
wherein the tubular body comprises a core layer formed from a first material and a coating layer formed from a second material;
wherein the second material has a higher modulus of elasticity than the first material; and
wherein the coating layer is bonded to the core layer by cladding.

10. The boring bar of claim 9, wherein the coating layer comprises a strip of material extending longitudinally along a portion of the core layer.

11. The boring bar of claim 10, further comprising a dynamic vibration absorber.

12. The boring bar of claim 11, further comprising a cutting element attached to the distal end of the bar.

13. The boring bar of claim 9, wherein the coating layer is a conical structure of varying thickness.

14. A method of forming a tunable or tuned boring bar having a distal end configured to support a tool, a proximal end configured for attachment to a support structure of a metalworking machine, and a tubular body extending between the proximal portion and the distal portion, having an elongated cylindrical cavity therein of substantially uniform diameter, the method comprising:
forming a body, at least a portion of which is tubular, by bonding a coating layer formed from a second material to a tubular core layer formed from a first material;
mounting a tunable or tuned absorber into a cavity of the body;
mounting a cutting tool to the distal end of the boring bar; and
securing the proximal end of the boring bar to a mounting structure of a metalworking machine,
wherein the second material has a higher modulus of elasticity than the first material; and
wherein the coating layer is bonded to the tubular core layer by cladding.

15. The method of claim 14, wherein the first material is carbon steel, stainless steel, a reinforced steel composite material, or any combination thereof.

16. The method of claim 14, wherein the second material is a carbide material.

17. The method of claim 14, wherein the coating layer comprises a strip of material wound about the core in a helical pattern.

18. The method of claim 14, wherein the coating layer comprises a strip of material extending in a straight path longitudinally along the core layer.

19. The method of claim 14, wherein a thickness of the coating layer is less than 10% of the diameter of the bar when the bar is cylindrical and less than 10% of the maximum width of the bar when the bar is not cylindrical.

* * * * *